(12) United States Patent
Corradi

(10) Patent No.: US 7,011,759 B1
(45) Date of Patent: Mar. 14, 2006

(54) VESSEL HEAD-FLUSH PROCESS

(75) Inventor: Jason T. Corradi, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 1 day.

(21) Appl. No.: 10/910,056

(22) Filed: Aug. 3, 2004

(51) Int. Cl.
*B01D 15/00* (2006.01)

(52) U.S. Cl. .................... 210/660; 210/196; 210/197

(58) Field of Classification Search ........... 210/194, 210/196, 197, 660
See application file for complete search history.

(56) References Cited

U.S. PATENT DOCUMENTS

| | | | |
|---|---|---|---|
| 2,985,589 A | 5/1961 | Broughton et al. ........... 210/34 |
| 3,040,777 A | * 6/1962 | Carson et al. ......... 137/625.15 |
| 3,422,848 A | * 1/1969 | Carson et al. ......... 137/625.15 |
| 5,595,665 A | 1/1997 | Noe ........................... 210/662 |

\* cited by examiner

*Primary Examiner*—Chester T. Barry
(74) *Attorney, Agent, or Firm*—John G. Tolomei; David J. Piasecki; Richard E. Conser

(57) ABSTRACT

Pressure is balanced within a partitioned process vessel by flushing the heads of the vessel. Careful handling of the flush purge removed from the head can mitigate the loss of valuable product to this stream.

4 Claims, 2 Drawing Sheets

VESSEL HEAD-FLUSH PROCESS

FIELD OF THE INVENTION

This invention relates generally to the processing of fluids over particulate solids. More specifically, this invention relates to the disposition of purge fluids from flushing the isolated head space of a pressure vessel containing particulate solids.

BACKGROUND OF THE INVENTION

Petroleum refining and petrochemical processes frequently involve the processing of fluids over particulate solids contained within a pressure vessel. Internal partitions can subdivide the interior of a pressure vessel into different chambers to permit staged or multiple contacting operations within a single vessel. These partitions routinely take the form of, or are used in conjunction with, collection or distribution grids. Process requirements, such as the collection and distribution of fluids, regularly dictate the employment of relatively flat partitions. Concomitantly, pressure vessels usually are closed by rounded "heads" at each end. The rounded head and flat interior partitions at each end of a vessel create a head space whose configuration is not suited to process purposes, risking contamination or deterioration of the process if this remains a dead volume.

Further, flat partitions are subject to structural damage from differential pressures of as little as 15 kPa or even less across the partition. Structural damage to a partition has the potential to create leaks across the partition or in associated distribution/collection piping.

Thus, maintaining structural integrity of interior end partitions requires pressure balancing between the head space and the adjoining volume on the process side of the partition. The head space can serve as an equalization chamber through a small opening or port in the partition communicating head fluid to and from the process chamber on the opposite side of the partition. However, this arrangement risks some inefficiency in the process through head fluid passing into the process chamber and some loss in yield through process fluid passing into the head space.

A specific technology which illustrates the above problem is the simulated moving bed ("SMB") adsorbent process described in U.S. Pat. No. 2,985,589. The process distributes and collects process streams from multiple chambers of adsorbent defined by internal partitions located within a pressure vessel and arranged as distribution/collection grids. Periodic shifting of the input and effluent streams through the chambers simulates movement of the adsorbent and permits delivery or withdrawal of the streams with a desired concentration profile. Delivering or withdrawing these process streams requires flat distribution grids.

The head space resulting from the flat distribution grids and a concave end is flushed by a small flow of a flush fluid, usually comprising a desorbent material, which equalizes pressure across the distribution grids. A desorbent material normally is selected so that passage of this material into the adsorbent bed through a grid opening does not contaminate the products of the process. However, the periodic shifting of the input and effluent streams through the chambers of adsorbent can effect a buildup of contaminants in the desorbent through leakage through the grid, particularly in the bottom head of the chamber. Further, the addition of desorbent to the adsorbent bed through the grid opening can interfere with the optimization of purity and recovery by taking up adsorbent capacity and hindering an accurate accounting of flow through the adsorbent beds.

U.S. Pat. No. 5,595,665, incorporated herein in its entirety by reference thereto, addresses these issues by channeling the fluid generated by a head flush into a low volume chamber (referred to herein as "snorkel") in the head space and withdrawing fluid from the pressure vessel through the snorkel. Withdrawing fluid generated by the head flush and channeling the fluid through the snorkel reduces or eliminates the circulation of fluid between the equalization chamber and the adjacent process chamber and minimizes the amount of contamination that can result from any circulation of fluid resulting from pressure fluctuations. The withdrawal of fluid through the snorkel also provides a non-contaminating path for withdrawing leakage from the equalization chamber of the vessel.

However, this feature fails to address how to prevent the loss of valuable product in the fluid withdrawn from the snorkel.

BRIEF DESCRIPTION OF THE INVENTION

A broad embodiment of the present process comprises passing a process fluid through a distribution grid in a process vessel having at least one rounded head, in which the grid and rounded head define an equalization chamber, removing the process fluid from the vessel through a circulation pump, passing a head-flush fluid into the equalization chamber in which a snorkel provides fluid communication between the adsorbent chamber and the equalization chamber, and withdrawing a head-flush purge from the vessel through the snorkel to the circulation pump.

Another embodiment of the process is a simulated moving bed adsorption process comprising passing a circulating fluid through a distribution grid in an adsorption vessel having at least one rounded head, contacting the fluid with an adsorbent disposed in an adsorbent chamber of the vessel which is separated by the distribution grid from an equalization chamber defined by the rounded head and distribution grid, removing the circulating fluid from the vessel through a withdrawal pump, passing a head-flush fluid into the equalization chamber in which a snorkel provides fluid communication between the adsorbent chamber and the equalization chamber, and withdrawing a head-flush purge from the vessel through the snorkel to the withdrawal pump.

A further embodiment of the process is a simulated moving bed adsorption process comprising passing a circulating fluid through first and second distribution grids in first and second adsorption vessels each having at least one rounded head, contacting the fluid with an adsorbent disposed in adsorbent chambers of the respective vessels which are separated by the respective distribution grids from first and second equalization chambers defined by the distribution grids and rounded heads, removing the circulating fluid from the vessels through first and second circulation pumps, passing a head-flush fluid into the respective equalization chambers in which first and second snorkels provide fluid communication between the respective adsorbent chambers and equalization chambers, and withdrawing first and second head-flush purges from the vessel through the respective snorkels to the respective circulation pumps.

The withdrawal of head-flush fluid through the snorkel quickly removes contamination from the distribution grid and ordinarily keeps the composition of the fluid near the opening in the partition between the equalizing chamber and the process chamber approximately the same as that of the entering head flush. By withdrawing the resulting head-flush purge through the snorkel to the circulating pump, valuable product contained in the head flush is retained in the process while creating a minimal effect on the composition of the circulating fluid.

Additional objects, embodiments, and details of the invention are set forth in the following detailed description of the invention.

DETAILED DESCRIPTION OF THE INVENTION

Figure 1:
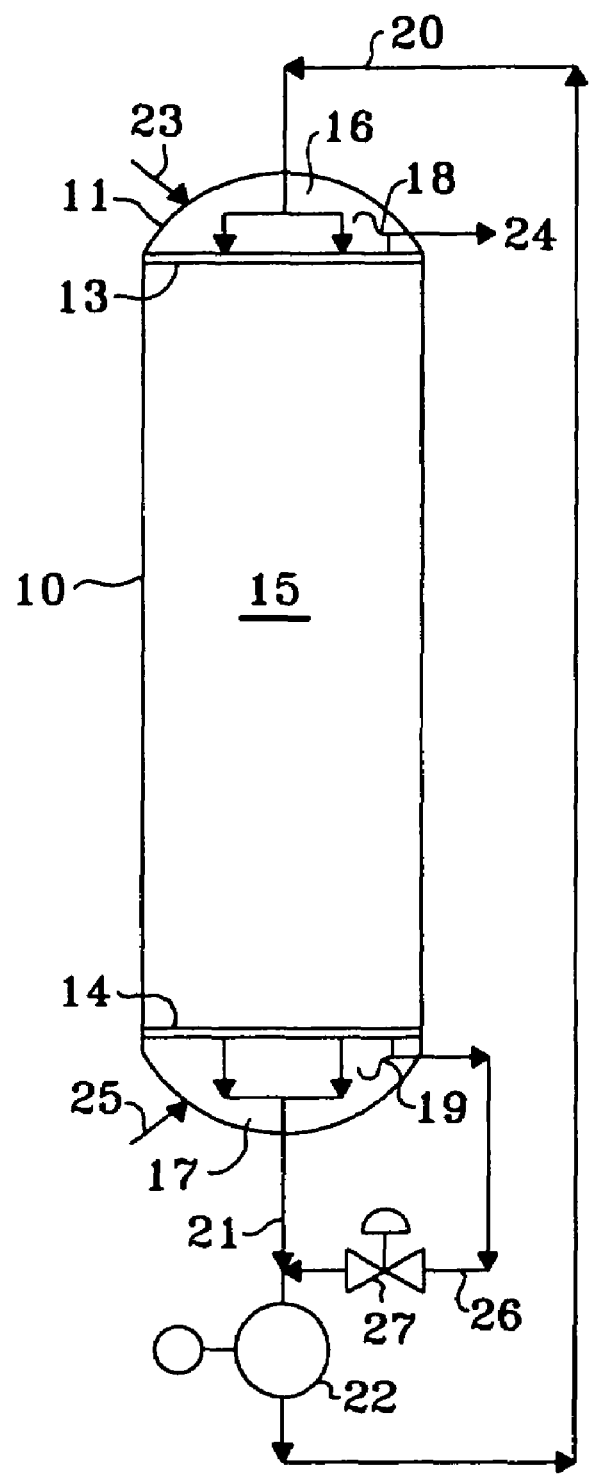
FIG. 1 is a schematic diagram of a process vessel having the end closure, distribution grid, snorkel and disposition of head-flush fluid of the invention.

A basic embodiment of the invention is shown in FIG. 1. Process vessel 10 comprises rounded heads 11 and 12, distribution grids 13 and 14, processing space 15, equalization chambers 16 and 17 defined by the respective rounded heads and distribution grids, and snorkels 18 and 19. Process fluid enters vessel 10 through line 20 through distribution grid 13 into processing space 15. The processing space 15 optionally may contain other distribution grids, particulate solids, and/or other processing equipment, and one or more feeds F may enter and products P may be removed from the processing space, but the nature of such materials is not critical to the invention. Process fluid leaves vessel 10 through grid 14 and line 21 through withdrawal pump 22. The process fluid may recirculate as shown to line 20, with the withdrawal pump functioning as a circulation pump, or process fluids 20 and 21 may be supplied from and to other vessels and processes.

Head-flush fluid is passed into equalization chamber 16 through line 23, and serves to equalize pressure across distribution grid 13 through snorkel 18 which communicates with the distribution grid. A head-flush purge optionally is removed from the snorkel via line 24 if the level of non-head-flush contaminants so dictates, and may be processed as discussed below or in other processing units. In the lower part of the process vessel, a head-flush fluid is passed into equalization chamber 17 through line 25, and serves to equalize pressure across distribution grid 14 through snorkel 19 which communicates with the distribution grid. A head-flush purge is removed from snorkel 19 via line 26 and sent to the suction of pump 22. Optionally, head-flush fluid from the upper part of the vessel in line 24 also may be connected into line 26, but head-flush contaminants dictating this routing are more likely to be present in the head flush from the lower part of the vessel. The quantity of the head-flush fluid in line 26 preferably is controlled through valve 27 by analysis of the level of contaminants in the stream via mass spectrometry or other methods known in the art, but this also may be pressure- or flow-controlled.

The snorkel may be configured in any manner suitable to the invention while communicating with the equalization chambers, distribution grids and means for withdrawing head-flush fluid from the process via line 26 and, optionally, line 24. The snorkels as shown have a "J" shape at the end of a straight pipe section, which communicates with the distribution/collection grids. The "J" end communicates with the interior of the head space. Suitable snorkels are described in previously cited U.S. Pat. No. 5,595,665.

The process of this invention can benefit new or existing processes that use a pressure-equalized partition to separate a volume into chambers with communication of fluid across the partition. Applicable processes may operate with liquid, gas, or mixed-phase conditions, with maximum benefit usually derived with liquid-phase conditions. Such processes generally include adsorptive or catalytic processes, with a particularly preferred process being the simulated moving bed adsorption process.

Figure 2:
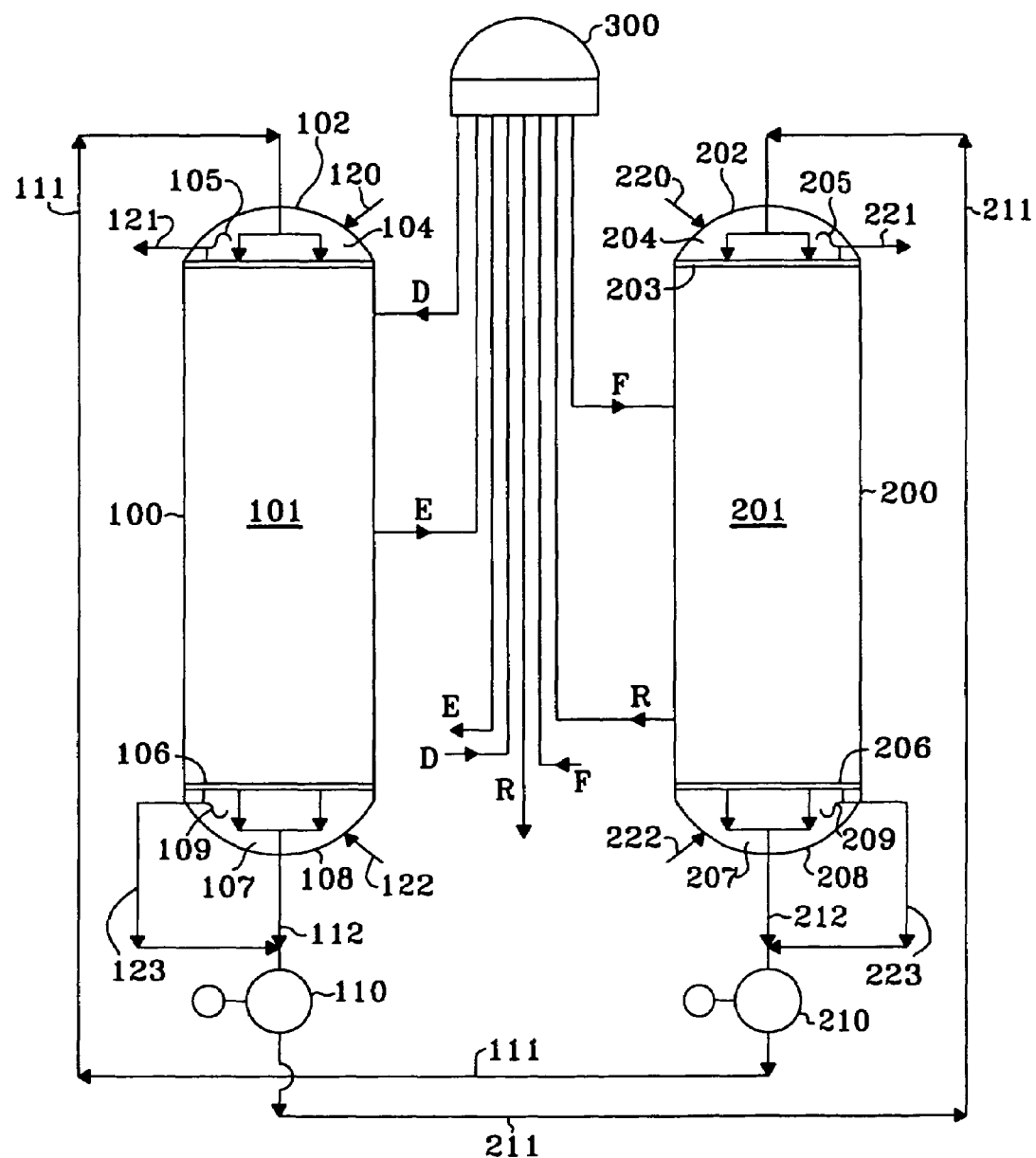
FIG. 2 is a schematic diagram of a simulated moving bed adsorption process comprising the features of the invention.

FIG. 2 is a schematic diagram of a simulated moving bed adsorption process employing the present invention. The process sequentially contacts a feed stream "F" with adsorbent contained in the vessels and a desorbent "D" to recover an extract stream "E" and a raffinate stream "R". Countercurrent moving bed or simulated moving bed countercurrent flow systems have a much greater separation efficiency than fixed-bed systems, as adsorption and desorption operations are continuously taking place with a continuous feed stream and continuous production of extract and raffinate. In the simulated moving bed countercurrent flow system, progressive shifting of multiple liquid feed and product access points down an adsorbent chamber simulate the upward movement of adsorbent contained in the chamber.

The various streams involved in simulated moving bed adsorption as illustrated in FIG. 2 may be characterized as follows. A "feed stream" is a mixture containing one or more extract components and one or more raffinate components to be separated by the process. The "extract stream" comprises a component, usually the desired product, which is more selectively adsorbed by the adsorbent. The "raffinate stream" comprises components which are less selectively adsorbed. "Desorbent" refers to a material capable of desorbing an extract component, which generally is inert to the components of the feed stream and easily separable from the extract and raffinate. The extract stream E and raffinate stream R from the illustrated scheme generally contain desorbent, which usually is separated from extract and raffinate components by conventional fractionation (not illustrated) and returned to the process in stream D.

The adsorbent in a simulated moving bed adsorption process is contained in multiple beds in one or more vessels; two vessels 100 and 200 in series are shown in FIG. 2. Each vessel contains multiple beds of adsorbent in processing spaces 101 and 201, respectively. Each of the vessels has a number of access points relating to the number of beds of adsorbent, and the position of the feed stream F, desorbent input D, extract stream E and raffinate stream R are shifted along the access points to simulate a moving adsorbent bed. A rotary disc type valve 300, as characterized for example in U.S. Pat. Nos. 3,040,777 and 3,422,848, effects the shifting of the streams to simulate countercurrent flow.

Circulating liquid comprising desorbent, extract and raffinate circulates through the vessels through pumps 110 and 210, respectively. Systems to control the flow of circulating liquid are described in U.S. Pat. No. 5,595,665, but the particulars of such systems are not essential to the present invention.

The active liquid access points effectively divide the adsorbent chamber into separate zones which move as the access points are shifted. The adsorption zone is located between the feed inlet stream F and the raffinate outlet stream R. In this zone, the feedstock contacts the adsorbent, an extract component is adsorbed, and a raffinate stream is withdrawn. Immediately upstream with respect to fluid flow is the purification zone, defined as the adsorbent between the extract outlet stream E and the feed inlet stream F. In the purification zone, the raffinate component is displaced from the nonselective void volume of the adsorbent and desorbed from the pore volume or surface of adsorbent shifting into this zone by passing a portion of extract stream material leaving the desorption zone. The desorption zone, upstream of the purification zone, is defined as the adsorbent between the desorbent inlet D and the extract stream outlet E. The desorbent passing into this zone displaces the extract component which was adsorbed by previous contact with feed in the adsorption zone. A buffer zone between the raffinate outlet stream R and the desorbent inlet stream D conserves the amount of desorbent utilized in the desorption step, in that a portion of the raffinate stream enters the buffer zone to displace desorbent material present in that zone into the desorption zone. The buffer zone contains enough adsorbent to prevent raffinate from passing into the desorption zone and contaminating the extract stream.

Usually the adsorbent chamber is divided into multiple compartments or "beds" as described in U.S. Pat. No. 2,985,589. The positions of the various streams described above are shifted along a series of access points relating to the number of beds. This arrangement eases the distribution of fluids into and out of the chamber through eliminating channeling and other inefficiencies, prevents convective back-mixing of fluid in a direction opposite to that of primary fluid flow, and prevents migration of adsorbent through the chamber. The beds are separated by profile wire screens covering the cross section of the vessel.

In an alternative embodiment, the wire screens are eliminated and a united adsorbent mass is supported on the lower distribution grid in each chamber. As the access points are into the adsorbent mass rather than between adsorbent beds, feed and product distributors must be designed to minimize the impact of flows on the adsorbent. To avoid plugging of the adsorbent mass with any debris entering with the feed or desorbent and to eliminate the loss of adsorbent fines leaving with the extract and raffinate in this embodiment, in-line strainers are installed on each of the access points. Effective strainers are well known in the industry, and the strainers may be of any design suitable for the separation of solids from hydrocarbon streams. Since each of the access points at different times will enable feed or desorbent to enter the chamber and products to leave the chamber, the strainers should be in a bi-directional arrangement; that is, two profile wire screens should be oriented at each of the access points such that the flat face of one screen always is exposed to the oncoming flow. The bi-directional flow of feed and product provides repeated backflushing of each screen in the strainer, flushing outside debris away from the chamber and adsorbent particles back into the chamber.

The principles of head flushing in the FIG. 2 adsorption vessels 100 and 200 are essentially as described for FIG. 1. The two vessels comprise respectively rounded heads 102 and 202, distribution grids 103 and 203, equalization chambers 104 and 204 defined by the respective rounded heads and distribution grids, and snorkels 105 and 205. Circulating fluid enters each vessel respectively through lines 111 and 211 through distribution grids 103 and 203 into adsorbent beds 101 and 201. The circulating fluid leaves the respective vessels through grids 106 and 206 and lines 112 and 212 through pumps 110 and 210 to the other vessel in series, i.e., through pump 110 to vessel 200 and through pump 210 to vessel 100.

Head-flush fluid is passed into equalization chambers 104 and 204 through line 120 and 220, respectively, and serves to equalize pressure across distribution grids 103 and 203 through snorkels 105 and 205 which communicate with the distribution grids. A head-flush purge optionally is removed from the snorkel via lines 121 and 221 if the level of non-head-flush contaminants so dictates, and may be processed as discussed below or in other processing units. In the lower part of the process vessel, head-flush fluid is passed into equalization chambers 107 and 207 defined by heads 108 and 208, respectively, through lines 122 and 222; this serves to equalize pressure across distribution grids 106 and 206 through snorkels 109 and 209 which communicate with the distribution grids. Head-flush purge is removed from snorkels 109 and 209 via lines 123 and 223 and sent respectively to the suction of pumps 110 and 210. Optionally, head-flush fluid from the upper part of the vessels in lines 121 and 221 also may be connected into lines 223 and 123, respectively, but head-flush contaminants dictating the routing of head-flush fluid to the pump suction are more likely to be present in the head flush from the lower part of the vessel. Flow of the head-flush fluid in lines 123 and 223 preferably is controlled by analysis of the level of contaminants in the streams via mass spectrometry or other methods known in the art, but also may be pressure- or flow-controlled.

The amount of fluid circulated through the head is independent of the process fluid circulated through the system. If the head flush contains a negligible level of valuable contaminants, as is usually the case in the top equalization space and snorkel of a chamber, the flow typically is set at a rate that will displace the volume of the flush chamber once in every step of the multi-step cycle. If the head flush contains valuable components to be recovered according to the present invention, the flow rate is less than 10 volume-%, and generally below 1%, of the circulating fluid; usually the flow rate is around 0.1% or less of the circulating fluid. Thus, the recovery of valuable components according to the invention should have a minor or negligible effect on the operation of the associated process.

The above description and examples are intended to be illustrative of the invention without limiting its scope. The skilled routineer will readily understand how to extrapolate parameters of the disclosure to other embodiments of the invention. The invention is limited only by the claims set forth herein.

I claim:

1. A process comprising passing a process fluid through a distribution grid in a process vessel having at least one rounded head, removing the process fluid from the vessel through a withdrawal pump, passing a head-flush fluid into an equalization chamber defined by the distribution grid and rounded head in which a snorkel provides fluid communication between the adsorbent chamber and the equalization chamber, and withdrawing a head-flush purge from the vessel through the snorkel to the withdrawal pump.

2. A simulated moving bed adsorption process comprising passing a circulating fluid through a distribution grid in an adsorption vessel having at least one rounded head, contacting the fluid with an adsorbent disposed in an adsorbent chamber of the vessel which is separated by the distribution grid from an equalization chamber defined by the rounded head and distribution grid, removing the circulating fluid from the vessel through a circulation pump, passing a head-flush fluid into the equalization chamber in which a snorkel provides fluid communication between the adsorbent chamber and the equalization chamber, and withdrawing a head-flush purge from the vessel through the snorkel to the circulation pump.

3. The simulated moving bed adsorption process of claim 2 wherein the adsorption vessel contains a united adsorbent mass supported on the distribution grid and strainers are installed in a bi-directional arrangement on each access point to the adsorption vessel.

4. A simulated moving bed adsorption process comprising passing a circulating fluid through first and second distribution grids in first and second adsorption vessels each having at least one rounded head, contacting the fluid with an adsorbent disposed in adsorbent chambers of the respective vessels which are separated by the respective distribution grids from first and second equalization chambers defined by the distribution grids and rounded heads, removing the circulating fluid from the vessels through first and second circulation pumps, passing a head-flush fluid into the respective equalization chambers in which first and second snorkels provide fluid communication between the respective adsorbent chambers and equalization chambers, and withdrawing a first and second head-flush purges from the vessel through the respective snorkels to the respective circulation pumps.

* * * * *